United States Patent
Crothers et al.

(10) Patent No.: US 9,303,564 B2
(45) Date of Patent: Apr. 5, 2016

(54) COMBUSTOR CAN TEMPERATURE CONTROL SYSTEM

(71) Applicant: GENERAL ELECTRIC COMPANY, Schenectady, NY (US)

(72) Inventors: Sarah Lori Crothers, Greenville, SC (US); Christan Xavier Stevenson, Inman, SC (US); David Leach, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 546 days.

(21) Appl. No.: 13/778,164

(22) Filed: Feb. 27, 2013

(65) Prior Publication Data

US 2014/0238041 A1 Aug. 28, 2014

(51) Int. Cl.
| F02C 7/22 | (2006.01) |
| F02C 9/34 | (2006.01) |
| F02C 7/24 | (2006.01) |
| F02C 7/224 | (2006.01) |
| F02C 7/228 | (2006.01) |

(52) U.S. Cl.
CPC . *F02C 7/24* (2013.01); *F02C 7/222* (2013.01); *F02C 7/224* (2013.01); *F02C 7/228* (2013.01); *F05D 2260/96* (2013.01)

(58) Field of Classification Search
CPC ............ F23R 3/34; F23R 3/343; F23R 3/346; F02C 7/222; F02C 7/224; F02C 7/228; F02C 9/34
See application file for complete search history.

(56) References Cited

U.S. PATENT DOCUMENTS

| 2,619,162 | A | * | 11/1952 | Feilden | ............... F02C 7/232 137/471 |
| 2,629,225 | A | * | 2/1953 | Ammann | ............... F02C 3/14 60/248 |
| 2,694,899 | A | * | 11/1954 | Hague | ............... F02C 7/224 60/736 |
| 4,027,474 | A | * | 6/1977 | Demase | ............... F02C 7/228 137/101 |
| 6,250,063 | B1 | * | 6/2001 | Davis, Jr. | ............... F02C 7/228 60/39.281 |
| 7,188,465 | B2 | * | 3/2007 | Kothnur | ............... F02C 7/222 60/39.281 |
| 7,578,130 | B1 | | 8/2009 | Kraemer et al. | |
| 2003/0014979 | A1 | * | 1/2003 | Summerfield | ............ F23R 3/34 60/776 |
| 2004/0221582 | A1 | * | 11/2004 | Howell | ............... F23R 3/343 60/778 |
| 2009/0126367 | A1 | * | 5/2009 | Chhabra | ............... F02C 7/228 60/734 |
| 2010/0313568 | A1 | | 12/2010 | Davis, Jr. et al. | |
| 2011/0072826 | A1 | | 3/2011 | Narra et al. | |
| 2011/0162370 | A1 | | 7/2011 | Kim et al. | |
| 2011/0179795 | A1 | | 7/2011 | Johnson et al. | |
| 2013/0340438 | A1 | * | 12/2013 | Abreu | ............... F02C 7/222 60/772 |

OTHER PUBLICATIONS

U.S. Appl. No. 13/182,956, filed Jul. 14, 2011, Romig, et al.

* cited by examiner

*Primary Examiner* — Phutthiwat Wongwian
*Assistant Examiner* — Rene Ford
(74) *Attorney, Agent, or Firm* — Sutherland Asbill & Brennan LLP

(57) ABSTRACT

The present application provides a fuel delivery system for a combustor with reduced coherence and/or reduced combustion dynamics. The combustor can assembly may include a first manifold for delivering a first flow of fuel to a first set of fuel injectors and a second manifold for delivering a second flow of fuel to a second set of fuel injectors. The first flow of fuel may have a first temperature and the second flow of fuel may have a second temperature. The first temperature may be higher than the second temperature.

17 Claims, 4 Drawing Sheets

COMBUSTOR CAN TEMPERATURE CONTROL SYSTEM

TECHNICAL FIELD

The present application and the resultant patent relate generally to gas turbine engines and more particularly relate to a can and/or circuit level fuel temperature control system for combustion coherence reduction.

BACKGROUND OF THE INVENTION

Combustor cans in a multiple can array may communicate acoustically with each other. Large pressure oscillations, also known as combustion dynamics, may result when heat release fluctuations couple with combustor can acoustic tones. At particular operating conditions, combustion dynamics at specific frequencies and with sufficient amplitudes, which are in-phase and coherent, may produce undesirable sympathetic vibrations in the turbine and/or other downstream components. Typically, this problem is managed by combustor tuning. Combustor tuning to protect the turbine buckets, however, may impose severe restrictions on the function and operability of the combustor.

Altering the frequency relationship between two or more combustors may reduce the coherence of the combustion system as a whole so as to diminish any combustor-to-combustor coupling. As used herein, coherence refers to the strength of the linear relationship between two (or more) dynamic signals, which is strongly influenced by the degree of frequency overlap between them. As the combustion dynamics frequency in one combustor is driven away from that of the other combustors, modal coupling of combustion dynamics may be reduced, which, in turn, may reduce the ability of the combustor tone to cause a vibratory response in downstream components.

There is thus a desire for improved systems and methods for coherence reduction between combustor components and turbine components without requiring combustor tuning and other types of conventional frequency avoidance techniques. Systems and methods that reduce the modal coupling of combustion dynamics by altering the frequency difference between two or more combustors would be useful for enhancing the thermodynamic efficiency of the combustors, protecting against accelerated wear, promoting flame stability, and/or reducing undesirable emissions over a wide range of operating levels, without detrimentally impacting the life of the downstream hot gas path components.

SUMMARY OF THE INVENTION

The present application and the resultant patent thus provide a fuel delivery system for a combustor with reduced coherence and/or reduced combustor dynamics. The combustor can assembly may include a first manifold for delivering a first flow of fuel to a first set of fuel injectors and a second manifold for delivering a second flow of fuel to a second set of fuel injectors. The first flow of fuel may have a first temperature while the second flow of fuel may have a second temperature. The first temperature may be higher than the second temperature.

The present application and the resultant patent further provide a method of reducing coherence and/or dynamics in a combustor. The method may include the steps of supplying a first flow fuel to a first set of fuel injectors at a first temperature and a first pressure, combusting the first flow of fuel, supplying a second flow of fuel to a second set of fuel injectors at a second temperature and a second pressure, and combusting the second flow of fuel.

The present application and the resultant patent further provide a fuel delivery system for a combustor can assembly with reduced coherence for improved component life. The combustor can assembly may include a first manifold for delivering a first flow of fuel to a first set of combustor cans and a second manifold for delivering a second flow of fuel to a second set of combustor cans. The first manifold may be in communication with a fuel heater. The second manifold may be in communication with a fuel blender. The first flow of fuel may have a first temperature and the second flow of fuel may have a second temperature. The first temperature may be higher than the second temperature.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
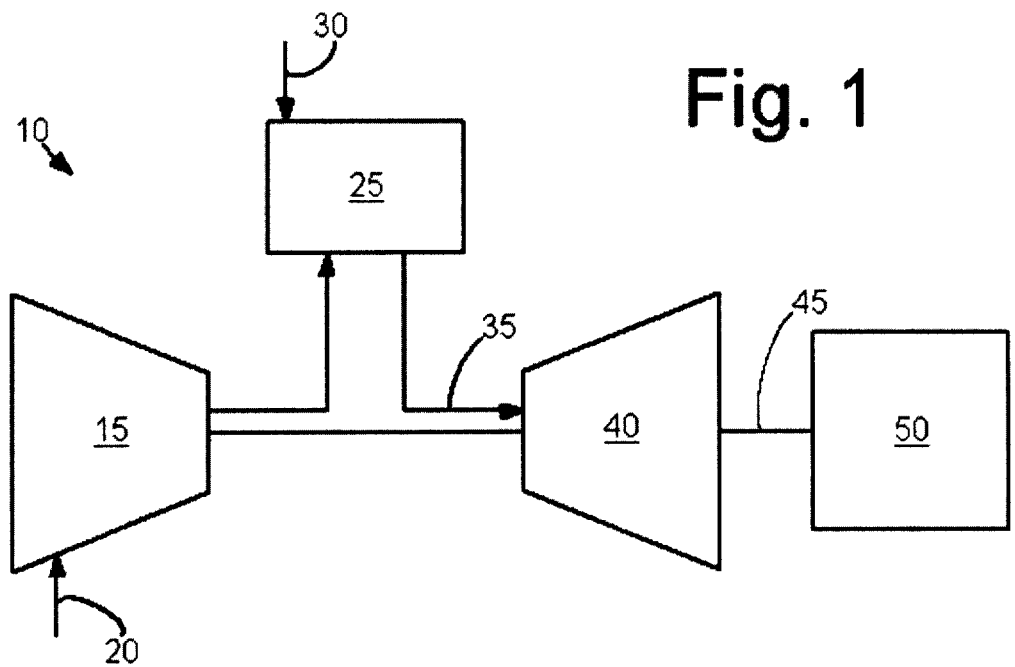
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25. The flow of the hot combustion gases 35 is in turn delivered to a turbine 40. The flow of the hot combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
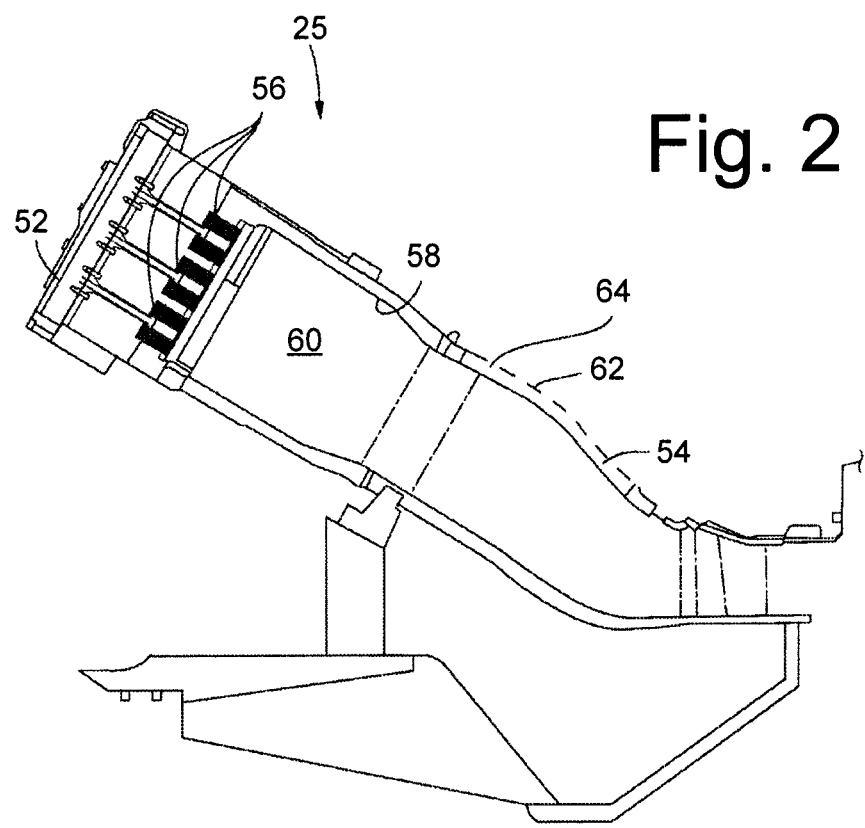
FIG. 2 is a schematic diagram of a combustor.

FIG. 2 shows a schematic diagram of an example of a combustor can 25 as may be used with the gas turbine engine 10 described above and elsewhere. The combustor can 25 may extend from an end cap 52 at a head end to a transition piece 54 at an aft end about the turbine 40. A number of fuel injectors 56 may be positioned about the end cap 52. A liner 58 may extend from the fuel injectors 56 towards the transition piece 54 and may define a combustion zone 60 therein. The liner 58 may be surrounded by a flow sleeve 62. The liner 58 and the flow sleeve 62 may define a flow path 64 therebetween for the flow of air 20 from the compressor 15 or otherwise. The combustor can 25 described herein is for the purpose of example only. Combustor cans with other components and other configurations may be used herein.

Figure 3:
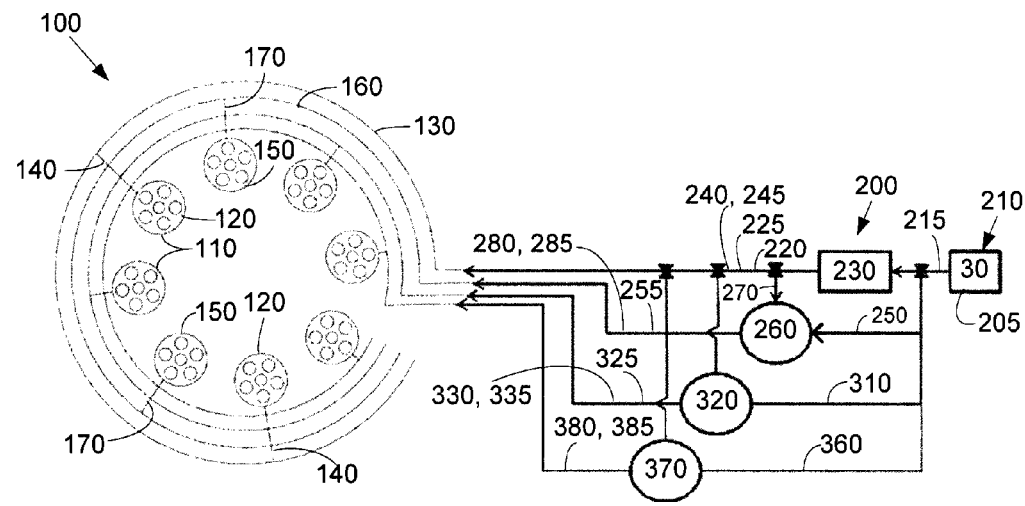
FIG. 3 is a schematic diagram of a combustor and a fuel delivery system as may be described herein.

FIG. 3 shows an example of a combustor can assembly 100 as may be described herein. The combustor can assembly 100 may include a number of combustor cans 110. Any number of the combustor cans 110 may be used herein. The combustor can assembly 100 may include a first set of combustor cans 120. Each of the combustor cans 110 may include at least one fuel injector 125. One or more fuel injectors 125 in each of the first set of combustor cans 120 may be in communication with a first manifold 130 via a number of first fuel lines 140. The combustor can assembly 100 also may include a second set of combustor cans 150. One or more fuel injectors 125 in each of the second set of combustor cans 150 may be in communication with a second fuel manifold 160 via a number of second fuel lines 170. Any number of manifolds, combustor can sets, and combustor cans may be used herein. Other components and other configurations also may be used herein.

The combustor can assembly 100 may be in communication with a fuel delivery system 200 as may be described herein. The fuel delivery system 200 may include a fuel supply 210. The fuel supply 210 may have a source flow 205 of the fuel 30 therein. Any type of fuel 30 may be used herein. The fuel supply 210 may be in communication with the first manifold 130 via a first manifold line 220 to deliver a first flow of fuel 225. The first flow of fuel 225 from the fuel supply 210 may be at an ambient temperature 215. The first manifold line 220 may be in communication with a fuel heater 230. The fuel heater 230 may heat the first flow of fuel 225 as it passes therethrough. The fuel heater 230 may be of conventional design and may heat the flow of fuel from any heat source. Heating the first flow of fuel 225 may improve the combustion characteristics of the first flow of fuel 225 in terms of dynamics and emissions performance but heating the flow also may increase the pressure ratio across the fuel injectors 125 of the combustor cans 110 of the first manifold 130. The first manifold line 220 thus delivers the first flow of fuel 225 at a first temperature 240 and a first pressure 245 to the first manifold 130. Other components and other configurations also may be used herein.

The fuel supply 210 may be in communication with the second manifold 160 via a second manifold line 250 to deliver a second flow of fuel 255. The second manifold line 250 may include a second line fuel blender 260 positioned thereon. The second line fuel blender 260 may have any configuration suitable for blending two or more flows of fuel therein. The second line fuel blender 260 also may be in communication with a tap off line 270 and the like extending from the first manifold line 220. The second fuel line blender 260 thus may blend the second flow of fuel 255 from the fuel supply 210 at the ambient temperature 215 with a portion of the first flow of fuel 225 from the first manifold line 220 at the first temperature 240 and the first pressure 245. The second flow of fuel 255 thus leaves the second line fuel blender 260 at a second temperature 280 and a second pressure 285. The second temperature 280 may be lower than the first temperature 240 but higher than the ambient temperature 215. Likewise, the second pressure 285 in the second manifold line 250 generally may be lower than the first pressure 245 in the first manifold line 220. The flows of fuel may have varying temperatures and varying pressures. Other components and other configurations also may be used herein.

In use, the fuel delivery system 200 thus delivers the first flow of fuel 225 to the first manifold 130 via the first manifold line 220 at the first temperature 240 and the first pressure 245. The fuel delivery system 200 also delivers the second flow of fuel 255 to the second manifold 160 via the second manifold line 250 at the second temperature 280 and the second pressure 285. As described above, reducing the pressure ratio across the fuel injectors 125 may have an impact on the frequency of the in-phase tones. Because coherence is a measure of the similarity of the frequency content between two signals, inducing a frequency shift between combustor cans 110 of the first set 120 of combustor cans 110 and the second set 150 of combustor cans 110 thus may reduce overall coherence. Specifically, by reducing the fuel temperature in a given subset of fuel injectors 125 in the combustor cans 110 while maintaining the fuel split and temperature, the pressure ratio across the fuel injectors 125 of the combustor cans 110 may be reduced. Inducing frequency differences between the combustor cans 110, or sets 120, 150 thereof, thus should reduce overall coherence. The overall frequency differences may be controlled from injector to injector, can to can, and/or the differences may be tunable at a system level.

Figure 4:
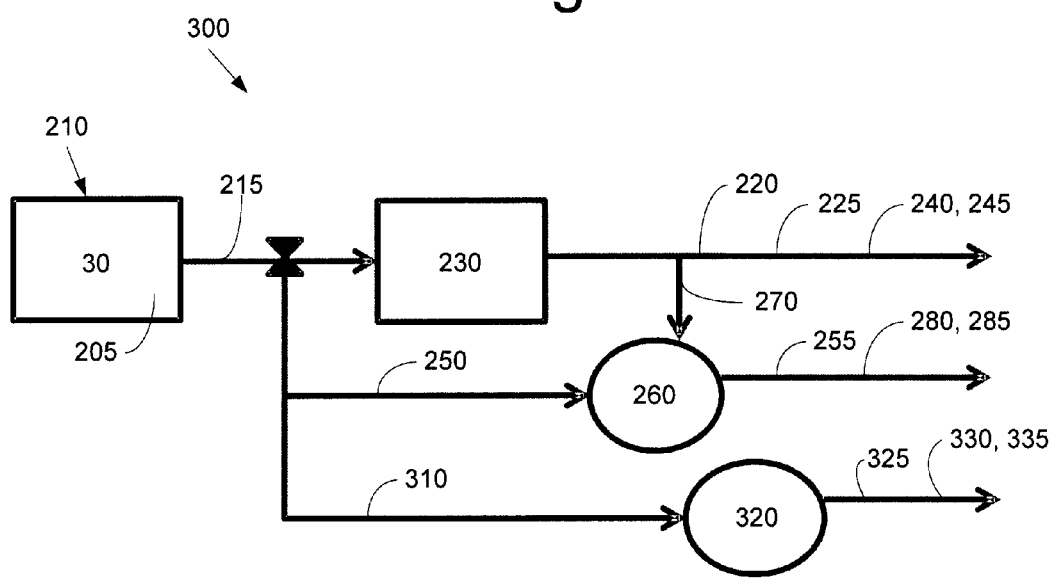
FIG. 4 is a schematic diagram of an alternative embodiment of a fuel delivery system as may be described herein.

FIGS. 3 and 4 show a further embodiment of a fuel delivery system 300 as may be described herein. Similar to that described above, the fuel delivery system 300 may include the fuel supply 210, the first manifold line 220 with a fuel heater 230, and the second manifold line 250 with the second line fuel blender 260. In this example, the fuel delivery system 300 also may include a third manifold line 310 in communication with the fuel supply 210. The third manifold line 310 may be in communication with a third manifold (not shown) of the combustor can assembly 100 and a number of fuel injectors 125 in the combustor cans 110 therein. The third manifold line 310 may include a third line fuel blender 320. The third line fuel blender 320 may receive fuel from the fuel supply 210 and from a further tap off line 270 or from any other source. The third line fuel blender 320 may or may not be used. The third manifold line 320 thus may provide a third flow of fuel 325 at a third temperature 330 and a third pressure 335. The third temperature 330 may be less than or greater than the second temperature 280. The third temperature 330 also may be at the ambient temperature 215. The third pressure 335 may be less than or greater than the second pressure 245. Other components and other configurations may be used herein.

Figure 5:
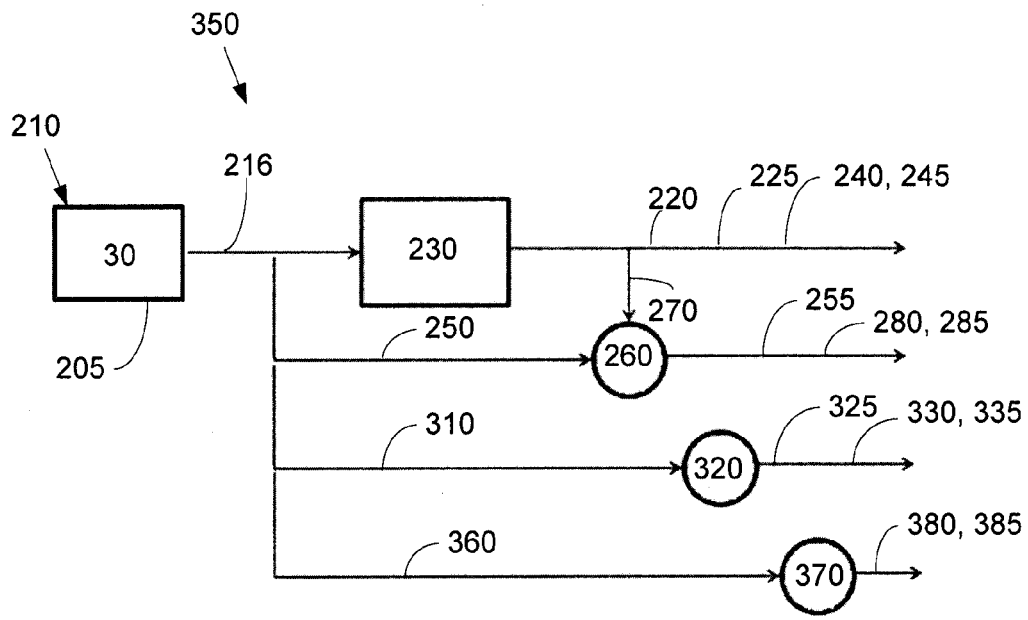
FIG. 5 is a schematic diagram of an alternative embodiment of a fuel delivery system as may be described herein.

FIGS. 3 and 5 show a further embodiment of a fuel delivery system 350 as may be described herein. Similar to those described above, the fuel delivery system 350 may include the fuel supply 210, the first manifold line 220 with the fuel heater 230 thereon, the second manifold line 250 with the second fuel blender 260 thereon, and the third manifold 310 with the third line fuel blender 320 thereon. The fuel delivery system 350 also may include a fourth manifold line 360 in communication with the fuel supply 210. The fourth manifold line 360 may be in communication with a fourth manifold (not shown) of the combustor can assembly 100. The fourth manifold line 360 may include a fourth line fuel blender 370. The fourth line fuel blender 370 may receive fuel from the fuel supply 210 and from a further tap off line 270 or from any other source. The fourth line fuel blender 370 may or may not be used. The fourth manifold line 360 thus may deliver a fourth flow of fuel 375 at a fourth temperature 380 and a fourth pressure 385. The fourth temperature 380 may be less or greater than the third temperature 330 or the second temperature 280. The fourth temperature 380 also may be at the ambient temperature 215. The fourth pressure 385 may be less than or greater than the third pressure 335 or the second pressure 245. Other components and other configurations may be used herein.

Any number of pressure and frequency variations are possible herein. For example, each combustor can 110 may be in communication with any number of manifolds such that fuel may be provided to one or more of the fuel injectors 125 in any individual combustor can 110 at the first temperature 240 or the second temperature 280 as desired. Preferably, the fewest number of combustor cans 110 and fuel injectors 125 being fed with the cooler fuel may be desired for maintaining adequate dynamics performance. The combustor cans 110 receiving the cooler fuel may be spaced evenly or unevenly about the assembly 100. For example, one or more of the fuel injectors 125 in every other combustor can 110 may receive the cooler fuel, one or more fuel injectors 125 in every N-th combustor can 110 may receive the cooler fuel, or one or more fuel injectors 125 in a number of adjacent cans may receive the cooler fuel. Moreover, one or more fuel injectors 125 in every combustor can 110 may receive a separate supply of fuel at a varying temperature, one or more fuel injectors 125 in every N-th combustor can 110 may receive a supply of fuel at a specified temperature, or one or more fuel injectors 125 in a number of adjacent cans may receive such.

Figure 6:
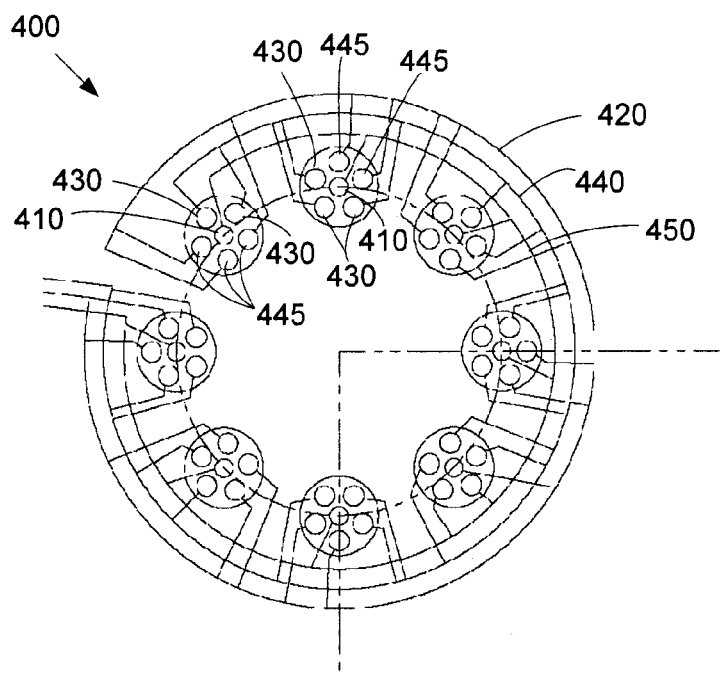
FIG. 6 is a schematic diagram of an alternative embodiment of a fuel delivery system as may be described with multiple fuel circuits in communication with a number of fuel injectors.

Further, individual fuel circuits for each fuel injector 125 or subsets of fuel injectors 125 within each of the combustor cans 110 also may be temperature controlled within each or several of the combustor cans 110. FIG. 6 shows a fuel delivery system 400 with a number of fuel injectors 125 in one or more combustor cans 110 in communications with a number of fuel circuits. Specifically, a first subset 410 of fuel injectors 125 may be in communication with a first fuel circuit 420, a second subset 430 of fuel injectors 125 may be in communication with a second circuit 440, and a third subset 445 of fuel injectors 125 may be in communication with a third circuit 450. Any number of fuel injectors 125 and circuits may be used herein. Each circuit may deliver a flow of fuel 30 at different temperatures to the subset of fuel injectors 125. Combinations of circuits also may be used.

Different fuel circuits and temperatures may be used depending upon differing operational parameters. The different temperatures of the flows of fuel thus provide different pressure ratios across the individual fuel injectors so as to generate different frequencies. The combustion instabilities at such different frequencies may add destructively so as to reduce the combustion dynamics within a combustor can 110 and to provide a coherence benefit. Other components and other configurations also may be used herein.

Figure 7:
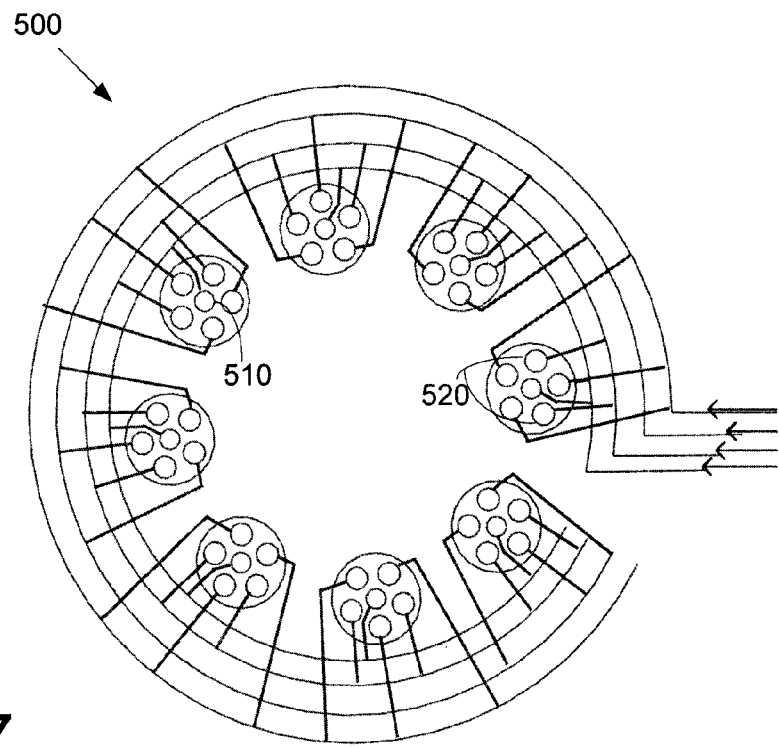
FIG. 7 is a schematic diagram of an alternative embodiment of a fuel delivery system as may be described with multiple fuel circuits in communication with a number of fuel injectors.
Figure 8:
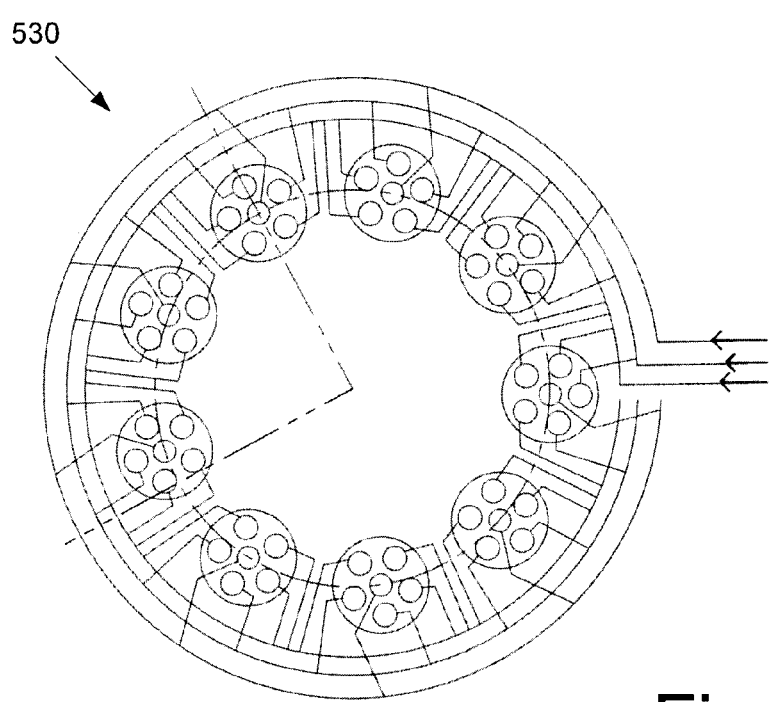
FIG. 8 is a schematic diagram of an alternative embodiment of a fuel delivery system as may be described with multiple fuel circuits in communication with a number of fuel injectors.

By way of further example, FIG. 7 shows certain fuel injectors 125 in each combustor can 110 in communication with the same manifold and other fuel injectors in each combustor can in communication with different manifolds. Fuel delivery system 500 shows a first group of fuel injectors 510 in the combustor cans 110 in communication with the first manifold. A second group of fuel injectors 520 in the combustor cans may be in communication with the second manifold. A third group also may be in communication with either the third or fourth manifold. Alternatively, FIG. 8 shows a fuel delivery system 530 with a more random configuration of fuel injector groupings. Here, all of the fuel nozzle groups may be split between different manifolds. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A fuel delivery system for a combustor with reduced coherence and/or reduced combustion dynamics, comprising:
   a first manifold for delivering a first flow of fuel to a first set of fuel injectors;
   wherein the first manifold comprises a fuel heater to heat the first flow of fuel; and
   a second manifold for delivering a second flow of fuel to a second set of fuel injectors;
   wherein the second manifold comprises a fuel blender in communication with a source flow at an ambient temperature and the heated first flow of fuel to create the second flow of fuel;
   the first flow of fuel comprising a first temperature;
   the second flow of fuel comprising a second temperature; and
   wherein the first temperature is higher than the second temperature.

2. The fuel delivery system of claim 1, wherein the first set of fuel injectors are positioned within a first combustor can and wherein the second set of fuel injectors are positioned within a second combustor can.

3. The fuel delivery system of claim 1, wherein the first set of fuel injectors are positioned within a first combustor can and wherein the second set of fuel injectors are positioned within the first combustor can.

4. The fuel delivery system of claim 1, further comprising a first manifold line in communication with the first manifold and a fuel source.

5. The fuel delivery system of claim 4, wherein the first manifold line comprises the fuel heater thereon.

6. The fuel delivery system of claim 4, further comprising a second manifold line in communication with the second manifold and the fuel source with the source flow at the ambient temperature.

7. The fuel delivery system of claim 6, wherein the second manifold line comprises the fuel blender thereon.

8. The fuel delivery system of claim 7, wherein the fuel blender comprises a tap off line in communication with the first flow of fuel such that the fuel blender blends the source flow at the ambient temperature and the first flow at the first temperature.

9. The fuel delivery system of claim 6, further comprising a third manifold line in communication with a fuel source.

10. The fuel delivery system of claim 9, wherein the third manifold line comprises a fuel blender thereon.

11. The fuel delivery system of claim 9, wherein the third manifold line comprises a third flow of fuel therein at a third temperature and wherein the third temperature is less than or greater than the second temperature.

12. The fuel delivery system of claim 11, further comprising a fourth manifold line in communication with a fuel source.

13. The fuel delivery system of claim 12, wherein the fourth manifold line comprises a fuel blender thereon.

14. The fuel delivery system of claim 12, wherein the fourth manifold line comprises a fourth flow of fuel therein at a fourth temperature and wherein the fourth temperature is less than or greater than the second temperature or the third temperature.

15. A fuel delivery system for a combustor can assembly with reduced coherence and/or combustion dynamics, comprising:
- a first manifold for delivering a first flow of fuel to a first set of combustor cans;
- a fuel heater in communication with the first manifold to heat the first flow of fuel;
- a second manifold for delivering a second flow of fuel to a second set of combustor cans;
- the second manifold in communication with a source flow at an ambient temperature; and
- a fuel blender in communication with the ambient source flow of the second manifold and the heated first flow of fuel to create the second flow of fuel;
- the first flow of fuel comprising a first temperature;
- the second flow of fuel comprising a second temperature; and
- wherein the first temperature is higher than the second temperature.

16. The fuel delivery system of claim 15, further comprising a third manifold, wherein the third manifold comprises a third flow of fuel therein at a third temperature, and wherein the third temperature is less than or greater than the second temperature.

17. The fuel delivery system of claim 16, further comprising a fourth manifold, wherein the fourth manifold comprises a fourth flow of fuel therein at a fourth temperature, and wherein the fourth temperature is less than or greater than the second temperature or the third temperature.

* * * * *